US009436997B2

(12) United States Patent
Cerqueira et al.

(10) Patent No.: US 9,436,997 B2
(45) Date of Patent: Sep. 6, 2016

(54) ESTIMATING RAINFALL PRECIPITATION AMOUNTS BY APPLYING COMPUTER VISION IN CAMERAS

(71) Applicant: INTERNATIONAL BUSINESS MACHINES CORPORATION, Armonk, NY (US)

(72) Inventors: Renato F. Cerqueira, Rio de Janeiro (BR); Kiran Mantripragada, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/748,125

(22) Filed: Jun. 23, 2015

(65) Prior Publication Data

US 2016/0148383 A1    May 26, 2016

Related U.S. Application Data

(63) Continuation of application No. 14/551,238, filed on Nov. 24, 2014.

(51) Int. Cl.
| | |
|---|---|
| G06K 9/68 | (2006.01) |
| G06T 7/00 | (2006.01) |
| G01W 1/14 | (2006.01) |
| H04N 5/225 | (2006.01) |
| G06K 9/46 | (2006.01) |
| G06K 9/62 | (2006.01) |

(52) U.S. Cl.
CPC .............. *G06T 7/0036* (2013.01); *G01W 1/14* (2013.01); *G06K 9/4604* (2013.01); *G06K 9/6202* (2013.01); *H04N 5/225* (2013.01); *G06T 2207/20056* (2013.01); *G06T 2207/20061* (2013.01); *G06T 2207/20064* (2013.01); *G06T 2207/20224* (2013.01)

(58) Field of Classification Search
None
See application file for complete search history.

(56) References Cited

U.S. PATENT DOCUMENTS

| | | | | |
|---|---|---|---|---|
| 6,097,024 A | * | 8/2000 | Stam | B60S 1/0822 250/208.1 |
| 2010/0157076 A1 | | 6/2010 | Garg et al. | |
| 2011/0204206 A1 | * | 8/2011 | Taoka | B60S 1/0844 250/208.1 |

(Continued)

FOREIGN PATENT DOCUMENTS

CN      102707340       10/2012

OTHER PUBLICATIONS

U.S. Appl. No. 14/551,238, filed Nov. 2014, Cerqueira et al.*

(Continued)

*Primary Examiner* — Andrew Moyer
(74) *Attorney, Agent, or Firm* — Tutunjian & Bitetto, P.C.; Louis J. Percello

(57) ABSTRACT

A method and system are provided. The method includes storing a set of references images without rain and spanning a plurality of different light conditions. The method further includes capturing, using a camera, an image of a scene with rain. The method also includes selecting a reference image from the set of reference images based on the light condition of the captured image. The method additionally includes performing an arithmetic subtraction image processing operation between the captured image and the reference image to generate a subtraction image. The method further includes estimating an amount of rain in the subtraction image based on previously calibrated values.

15 Claims, 3 Drawing Sheets

(56) References Cited

U.S. PATENT DOCUMENTS

| | | | |
|---|---|---|---|
| 2013/0208120 A1* | 8/2013 | Hirai | H04N 7/18 348/148 |
| 2014/0064566 A1* | 3/2014 | Shreve | G06K 9/00335 382/107 |
| 2015/0117705 A1* | 4/2015 | Zhang | G06K 9/00812 382/103 |

OTHER PUBLICATIONS

List of IBM Patents or Patent Applications Treated as Related.

Garg, K., et al. "When Does a Camera See Rain?" 10th IEEE International Conference on Computer Vision (ICCV 2005). Oct. 2005. (8 Pages).

Garg, K., et al. "Vision and Rain" International Journal of Computer Vision. vol. 75. No. 1. Oct. 2007. (25 Pages).

Yatagai, A., et al. "Aphrodite Constructing a Long-Term Daily Gridded Precipitation Dataset for Asia Based on a Dense Network of Rain Gauges" American Meteorological Society. Sep. 2012. pp. 1401-1415.

Wikipedia, "IBM Deep Thunder" <http://en.wikipedia.org/wiki/IBM_Deep_Thunder> Oct. 2014. (4 Pages)

IBM Research. "Deep Thunder Forecasts" <ftp://ftp.software.ibm.com/systems/weather/live/dtwx.html> Oct. 2014. (6 Pages).

IBM. "Deep Thunder" <http://www.-03.ibm.com/ibm/history/ibm100/us/en/icons/deepthunder/> Oct. 2014. (3 Pages).

Elert, G., et al. "Speed of Falling Raindrop" <http://hypertextbook.com/facts/2007/EvanKaplan.shtml> Oct. 2014. (3 Pages).

USGS, The USGS Water Science School. "Why raindrops are different sizes" <http://water.usgs.gov/edu/raindropsizes.html> Oct. 2014. (3 Pages).

* cited by examiner

ESTIMATING RAINFALL PRECIPITATION AMOUNTS BY APPLYING COMPUTER VISION IN CAMERAS

CROSS-REFERENCE TO RELATED APPLICATIONS

This application is a Continuation application of co-pending U.S. patent application Ser. No. 14/551,238, filed on Nov. 24, 2014, which is incorporated herein by reference in its entirety.

BACKGROUND

1. Technical Field

The present invention relates generally to information capture and, in particular, to estimating rainfall precipitation amounts by applying computer vision in cameras.

2. Description of the Related Art

The influence of weather and climatic events are extremely important in virtually all contexts and businesses. All sorts of companies, no matter what they produce, can be affected somehow by weather events. Agriculture, the stock market, insurance, energy generation and distribution, road traffic, airports (flight control, ground operations, and logistics), city operations on the imminence of natural disasters, among many other situations and contexts, would be affected by weather events, but mainly in "extreme weather events". Due to these reasons, cities, companies and weather agencies must be well instrumented in such a way they could predict, act, operate, implement recovery plans, and so on.

Nowadays, rain gauges are very important devices that allow better decision making for all sorts of cities operations and businesses. It is somewhat common to find rain gauges or full weather stations installed in some places, but never in a sufficient amount to cover the entire city (spatially-wise), irrespective of risky areas. In addition to that, the coverage of these sensors is far from adequate to be assimilated by numerical models (as initial and boundary conditions). These numerical models can be weather forecast models, flood predictions, air quality analysis and forecast, drought forecast and analysis, besides other purposes.

SUMMARY

According to an aspect of the present principles, a method is provided. The method includes storing a set of references images without rain and spanning a plurality of different light conditions. The method further includes capturing, using a camera, an image of a scene with rain. The method also includes selecting a reference image from the set of reference images based on the light condition of the captured image. The method additionally includes performing an arithmetic subtraction image processing operation between the captured image and the reference image to generate a subtraction image. The method further includes estimating an amount of rain in the subtraction image based on previously calibrated values.

According to another aspect of the present principles, a system is provided. The system includes a storage device for storing a set of references images without rain and spanning a plurality of different light conditions. The system further includes a camera for capturing an image of a scene with rain. The system also includes an image selector for selecting a reference image from the set of reference images based on the light condition of the captured image. The system additionally includes an image subtractor for performing an arithmetic subtraction image processing operation between the captured image and the reference image to generate a subtraction image. The system further includes a rain estimator for estimating an amount of rain in the subtraction image based on previously calibrated values.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to estimating rainfall precipitation amounts by applying computer vision in cameras. In an embodiment, the present principles turn regular cameras into rain gauges. As used herein, the term "regular camera" refers to a camera not originally configured or designed to operate as a rain gauge.

Hence, in an embodiment, the present principles assume that regular cameras can be used for more than just surveillance or traffic monitoring. Hence, in an embodiment, regular video or still cameras can be used to estimate the quantity of precipitation.

In an embodiment, we use computer vision to estimate precipitation amount. An advantage of using computer vision algorithms to process rainfall in regular cameras is that these cameras are wide spread due to low cost as well the existence of such cameras for other purposes like security, surveillance, and traffic monitoring, among others. Many times these cameras already exist and they are planned to be installed around the cities to address other issues. Since the images are being generated and sometimes they are also stored, they can be "easily" used for this new purpose as well. Hence, significant advantages of the present principles include low cost of implementation, ease of connectivity, and low computational requirements since the present principles can be based on computer vision algorithms.

Advantageously, the present principles address the problem of lack of weather instruments and reduce the whole "coverage" problem of rain sensors. While full-coverage may not always be possible, the coverage problem can be addressed by installing as many sensors as possible in a given area, coupled with mathematical algorithms to estimate precipitation at several points).

Advantageously, in an embodiment, the present principles can "learn" from previous training and the correct registration of thresholds. Moreover, in an embodiment, the present principles can raise alerts as needed. These and many other attendant advantages of the present principles are readily determined by one of ordinary skill in the art given the teachings of the present principles provided herein.

Figure 1:
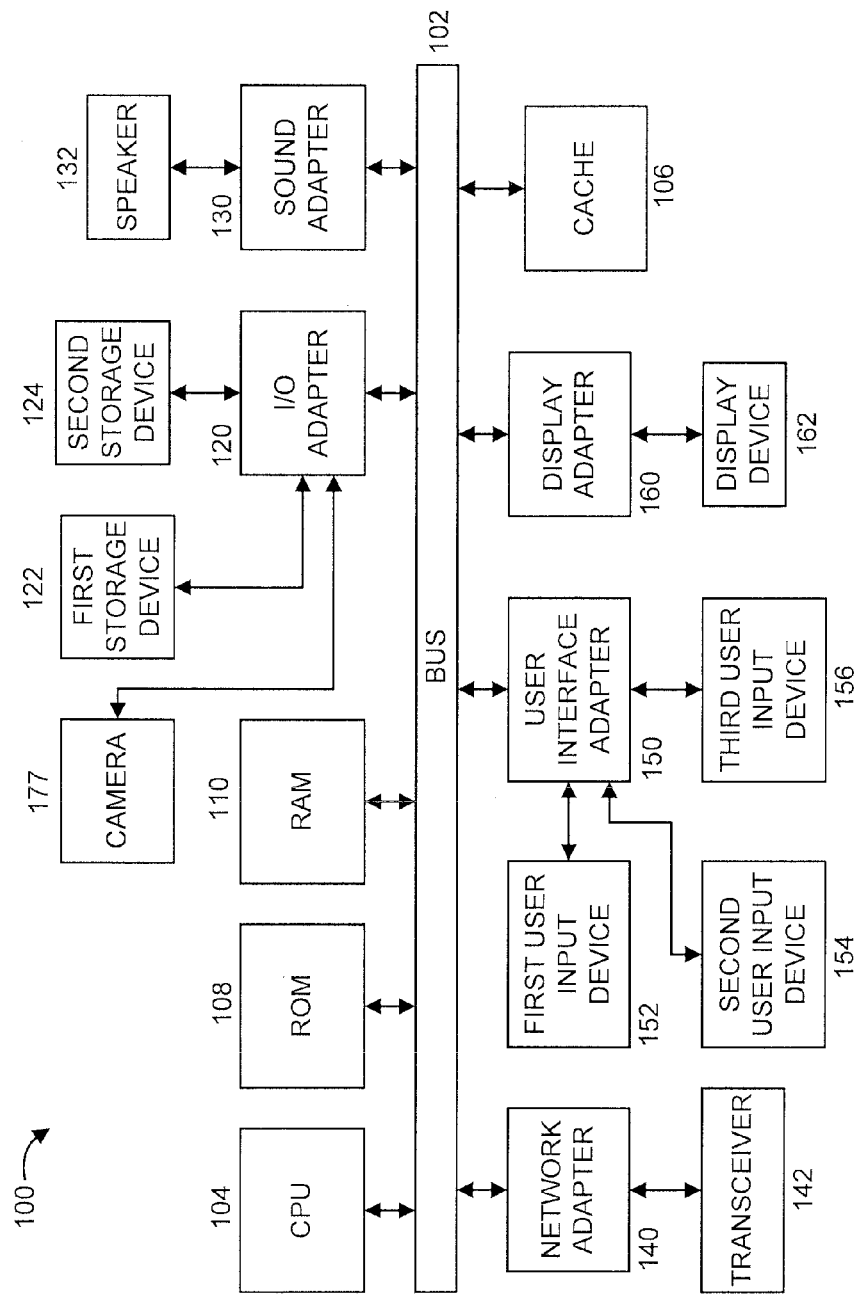
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122, a second storage device 124, and a camera 177 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
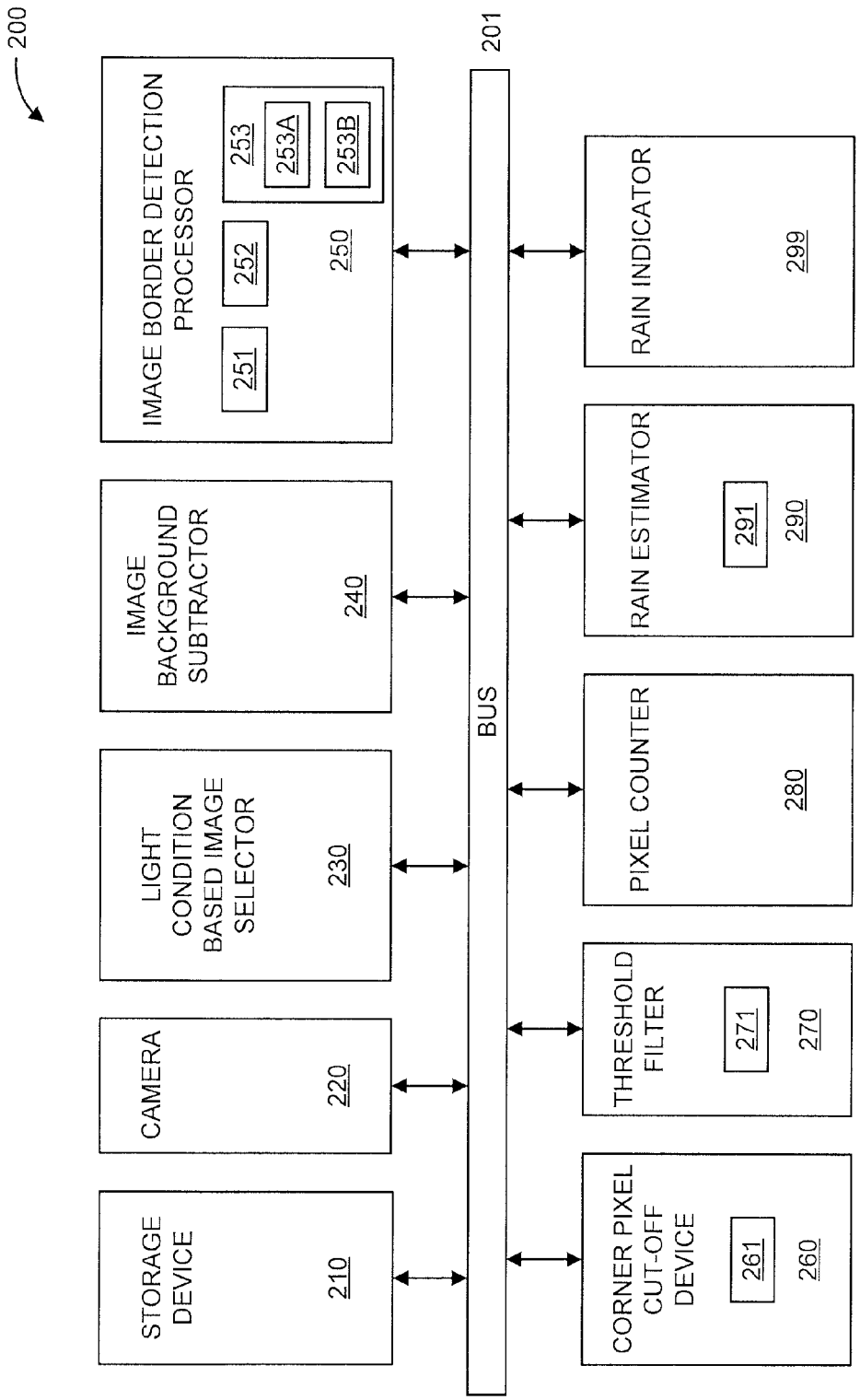
FIG. 2 shows an exemplary system 200 for estimating rainfall precipitation amounts, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
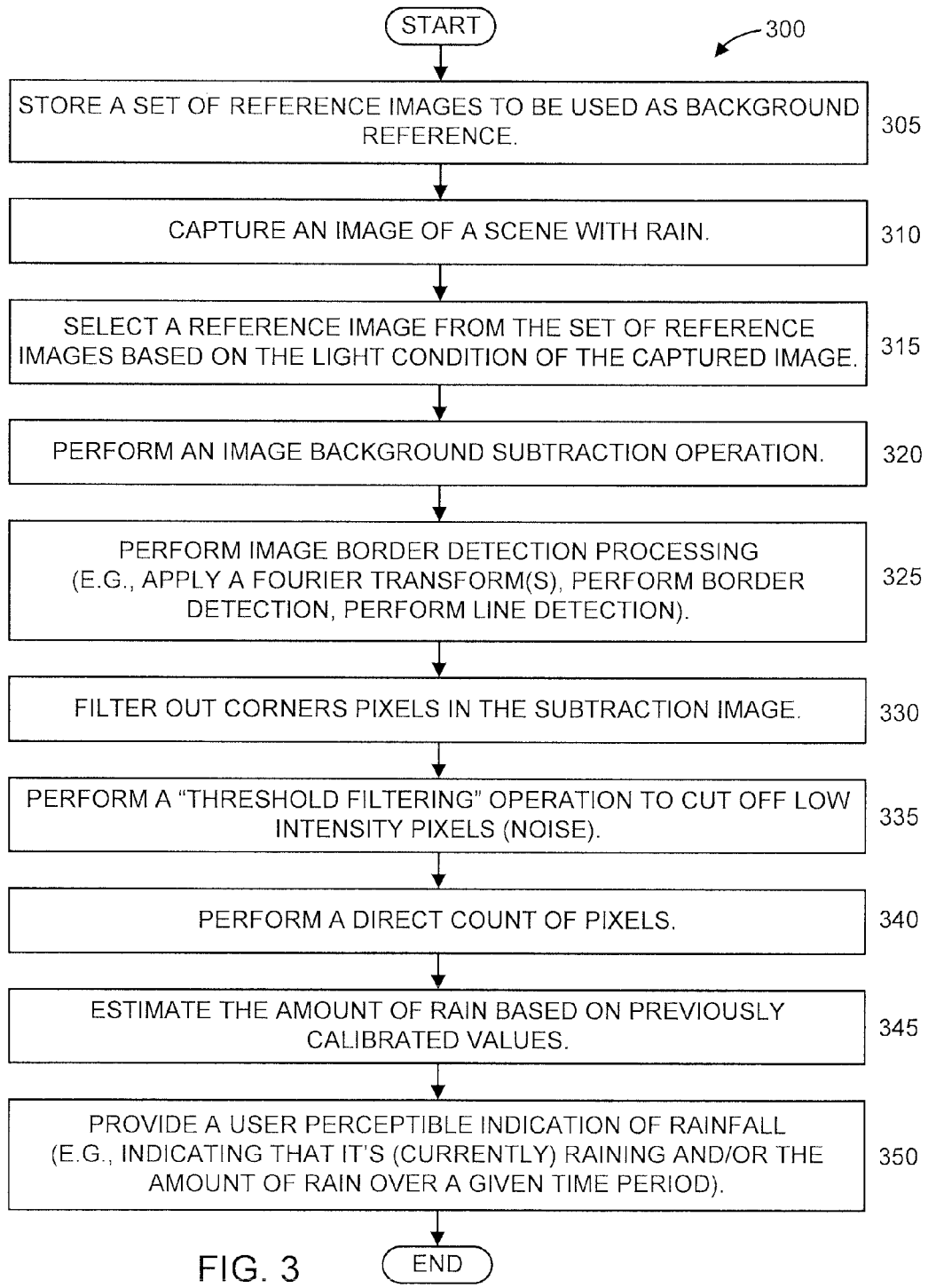
FIG. 3 shows an exemplary method 300 for estimating rainfall precipitation amounts, in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary system 200 for estimating rainfall precipitation amounts, in accordance with an embodiment of the present principles.

The system 200 includes a storage device 210, a camera 220, a light condition based image selector 230, an image background subtractor 240, an image border detection processor 250, a corner pixel cut-off device 260, a threshold filter 270, a pixel counter 280, a rain estimator 290, and a rain indicator 299.

The storage device 210 is for storing a set of images to be used as background reference.

The camera 220 is for capturing images (e.g., still images and/or video) to be used to determine the amount of precipitation. While one camera is shown in FIG. 2 for the sake of simplicity, it is to be appreciated that one or more cameras can be used in accordance with the teachings of the present principles. Preferably, many cameras are used in a given area in order to overcome the aforementioned coverage problem. In an embodiment, the camera 220 is also used to determine the current light condition, that is, the light condition of a captured image. In another embodiment, another source other than the camera 220 can be used to determine the current light condition. In an embodiment, the other source can include, but is not limited to, a new source such as the radio, printed media, digital media, and so forth.

The light condition based image selector 230 selects at least one of the images from the set that best matches the light condition of the captured image in which rain amount is to be detected.

The image background subtractor 240 performs an image background subtraction operation between an image captured by the camera 220 and a reference image stored in the storage device 210. The resultant image (hereinafter "subtraction image") can be analyzed to determine precipitation amount.

The border detection image processor 250 processes a result of the subtraction performed by the image background subtractor 240 (the "subtraction image"). In an embodiment, the border detection image processor 250 includes a Fourier transformer or wavelet transformer (collectively denoted by the reference numeral 251, and interchangeably referred to herein as "Fourier or wavelet transformer"), a border detector 252, and a line detector 253.

The Fourier or wavelet transformer 251 performs a Fourier (or equivalent wavelet) transform on the subtraction image to identify/enhance frequencies which describe the texture of raindrops.

The border detector 252 detects borders in the subtraction image. The border detector 252 can be and/or otherwise involve one or more of the following filters/filtering operations: Laplacian; difference of Gaussians; edge detector (e.g., Canny edge detector); Sobel; and so forth.

The line detector 253 detects lines of a certain orientation(s) in the subtraction image. In an embodiment, the line detector 253 includes a linear Hough transformer 253A and a circular Hough transformer 253B. However, it is to be appreciated that the present principles are not limited to Hough transforms and, thus, other line detection transforms and methods can also be used in accordance with the teachings of the present principles, while maintaining the spirit of the present principles.

The corner pixel cut-off device 260 cuts off corner pixels. In an embodiment, the corner pixel cut-off device 260 includes a Harris corner detector 261 for detecting corner pixels. Of course, other detectors can also be used in accordance with the teachings of the present principles, while maintaining the spirit of the present principles.

The threshold filter 270 performs a threshold filtering operation to cut off low intensity pixels (noise). In an embodiment, the threshold filter 270 includes a binary mask generator 271 for generating a binary mask.

The pixel counter 280 counts the number of pixels in an image. In an embodiment, the pixel counter 280 is masked based, and counts the pixels in a mask that have a certain value indicative of rain.

The rain estimator 290 estimates the amount of precipitation over a given time period. In an embodiment, the rain estimator 290 generates an estimation based on previously calibrated values. In an embodiment, the previously calibrated values are stored in the storage device 210. In another embodiment, the previously calibrated values can be obtained from another source.

In an embodiment, the rain estimator 290 includes a rain calibration value trainer 291 for adapting the rain calibrated values using one or more data adaptation methods. Hence, previously calibrated values can be recalibrated over time to improve precision. For example, once other sources of the rainfall amount are available, previous values of rainfall at a previous time as determined by the present principles can be compared to the amounts reported by the other sources in order to recalibrate the previous values and/or related thresholds in order to improve the precision of estimates over time. The preceding and other data training approaches can be used in accordance with the teachings of the present principles, while maintaining the spirit of the present principles.

The rain indicator 299 provides an indication of the fact that it is raining and/or an amount of rain. The rain indicator 299 can involve one or more of raising alarms, sending messages, creating incidents, creating reports, notifying information systems, turning on lights and/or varying one or more characteristics of the lights (e.g., colored lights, with color saturation thereof based on the amount of rain detected, and/or any light, and/or increasing light intensity with increasing rain), and so forth.

In the embodiment shown in FIG. 2, the elements thereof are interconnected by a bus 201. However, in other embodiments, other types of connections can also be used. Moreover, in an embodiment, at least one of the elements of system 200 is processor-based. Further, while the rain calibration value trainer 291 is shown as part of the rain estimator 290, in another embodiment these elements can be implemented as standalone elements. These and other variations of the elements of system 200 are readily determined by one of ordinary skill in the art, given the teachings of the present principles provided herein, while maintaining the spirit of the present principles.

FIG. 3 shows an exemplary method 300 for estimating rainfall precipitation amounts, in accordance with an embodiment of the present principles.

At step 305, store a set of reference images to be used as background reference. In an embodiment, the set of reference images include images with no rain, several days of the year, and several times of a day, preferably covering a lot of light conditions. In an embodiment, step 305 can be performed by the storage device 210.

At step 310, capture an image of a scene with rain. It is to be appreciated that while step 310 involves one captured image for the sake of simplicity, step 310 can involve capturing multiple images of the scene with rain, where each of the captured images are processed as described herein. In an embodiment, step 310 can be performed by the camera 220.

At step 315, select a reference image from the set of reference images based on the light condition of the captured image. In an embodiment, the reference image is selected from the set based upon at least one of day of year, time of day, and so forth, in order to match the light condition of the captured image. In an embodiment, step 315 can be performed by the light condition based image selector 230.

At step 320, perform an image background subtraction operation. In an embodiment, the image background subtraction operation can be as follows:

$$C(x,y)-T(x,y)=O(x,y)$$

where C denotes a current captured image, T denotes a template/reference image from the set, O denotes an output image with no background, but still with some "moving objects", x denotes a first spatial orientation (e.g., x-axis in a two-dimensional image), and y denotes a second spatial orientation orthogonal with respect to the first spatial orientation (e.g., y-axis in the two-dimensional image). In an embodiment, step 320 can be performed by the image background subtractor 240.

At step 325, perform border detection. In an embodiment, step 325 can involve one or more of the following: Fourier Transformation; wavelet transformation; border detection; and line detection. In an embodiment, step 325 can include applying a Fourier and/or wavelet transform to the subtraction image to identify/enhance frequencies which describe the texture of raindrops. In an embodiment, step 325 can include performing border detection to detect borders in the subtraction image. In this way, borders can be excluded from consideration in detecting rain in a subsequent step. The border detection can involve one or more of the following filters/filtering operations: Laplacian; difference of Gaussians; edge detector (e.g., Canny edge detector); Sobel; and so forth. In an embodiment, step 325 can include performing line detection to detect lines of a certain orientation(s). In an embodiment, the line detection can involve a linear Hough transform and/or a circular Hough transform. In an embodiment, step 325 can involve detecting straight and inclined lines in the subtraction image since rain drops show up like vertical or inclined lines in a captured image. In an embodiment, step 325 can be performed by the image border detection processor 250.

At step 330, filter out pixels that are parts of corners, not straight lines, from the subtraction image. In an embodiment, a Harris corner detector can be used. However, it is to be appreciated that other corner detectors can also be used in accordance with the teachings of the present principles, while maintaining the spirit of the present principles. In an embodiment, step 330 can be performed by the corner pixel cut-off device 260.

At step 335, perform a "threshold filtering" operation to cut off low intensity pixels (noise). In an embodiment, step 335 can include generated a binary mask. In an embodiment, a mask value of "0" denotes an empty cell (no rain), and a mask value of "1" denotes a rain pixel. Of course, other mask values and conventions can also be used, while maintaining the spirit of the present principles. In an embodiment, step 335 can be performed by the threshold filter 270.

At step 340, perform a count of pixels. In an embodiment, a direct count of pixels can be performed (e.g., with mask value=1 in the case when a binary mask is generated at step 335). In another embodiment, an indirect count of pixels can be performed (e.g., counting pixels with mask value of 0 and subtracting these pixels from the overall pixel count). These and other variations to counting pixels are readily determined by one of ordinary skill in the art, while maintaining the spirit of the present principles. In an embodiment, step 340 can be performed by the pixel counter 280.

At step 345, estimate the amount of rain based on previously calibrated values. In an embodiment, the following rules can be used to estimate the amount of rain. Of course, the present principles are not limited to the following rules to estimate the amount of rain and, thus, in other embodiments, other rules can also be used as readily determined by one of ordinary skill in the art given the teachings of the present principles provided herein, while maintaining the spirit of the present principles. For example, the granularity and precision is arbitrary and must be pre-defined and pre-calibrated depending upon the desired level of granularity and precision. In the following rules, N represents the pixel count taken at step 240, and x, y, z, and β represent various amounts of rain measured in millimeters:

0<N≤a-> represents x millimeters of rain;
a<N≤b-> represents y millimeters of rain
b<N≤c-> represents z millimeters of rain
c<N≤d-> represents β millimeters of rain
etc.

Of course, the present principles are not limited to the preceding rules and, thus, other rules (including other thresholds) can also be used in accordance with the teachings of the present principles, while maintaining the spirit of the present principles. In an embodiment, step 345 can be performed by the rain estimator 290.

At step 350, provide a user perceptible indication of rainfall. The indication can include indicating that it's (currently) raining and/or the amount of rain over a given time period. In an embodiment, step 350 can involve one or more of raising alarms, sending messages, creating incidents, creating reports, notifying information systems, turning on lights and/or varying one or more characteristics of the lights (e.g., colored lights, with color saturation thereof based on the amount of rain detected, and/or any light, and/or increasing light intensity with increasing rain), and so forth. In an embodiment, step 345 can be performed by the rain indicator 299.

A raindrop has been determined to vary from 0.5 mm to 2.5 mm diameter. When a raindrop is larger than that (e.g., from 2.5 to 4.5 mm), the drop tends to divide in to smaller drops, holding the assumption that each the raindrop would be limited 0.5-2.5 (mm). It has also been determined that the raindrop reaches "Terminal Velocity", v, as follows:

$$v=200*\sqrt{a}$$

where a=the diameter of the raindrop.

Another source shows that the raindrop "average velocity" is around 9 to 13 (m/s).

We now provide some exemplary calculations that can be made in accordance with the present principles. Let us assume an average speed of 10 meters per sec (m/sec). Also, we assume we will be using a regular PAL-M standard camera that grabs 29.7 frames per second (frames/sec), let say 30 frames/sec for the sake of simplicity. Thus, the capturing frame rate is 30 frames/sec. The exposure time for each frame would be 1/30 (seconds)=0.03333 seconds. Hence, the raindrop will "walk" through the image frame during 0.0333 seconds, where the following apply:

$$d=v/dt$$

where d is the displacement within the timeframe

In the example of a PAL-M video capture process, the displacement will be as follows:

$$d=10 \text{ m/s}*0.03333 \text{ s}$$

$$d=0.33 \text{ meters}$$

Thus, each frame will have to segment a line representing a raindrop(s) that blurred the image for 0.33 meters (the blurring aspect is due to the exposure time and the moving drop). As another example, if the raindrop falls with a slower speed (due to the its reduced mass and size), e.g., v=5 m/s, then the following applies:

$$d=5 \text{ m/s}*0.33333 \text{ s}=0.16 \text{ m}$$

By computing the size of the raindrop in the image, one would correlate with the volume of that raindrop and then with the amount and intensity of rain.

Since it is very difficult to compute the real size of the raindrop, because if can be captured from different distances from the camera, this invention proposes a technique that use machine learning approach (e.g., Convolutional Neural Networks, Deep Learning, Statistical Machine Learning, and so forth) to correlate the amount of pixels detected as rain, by learning from actual measurements made from external instruments.

Once that is done, we use a calibration that counts the amount of "rain pixels" (i.e., occurrences of blurring for 0.33 meters). The calibration is previously calibrated data than can be refined over time to improve precision.

Regarding camera focus, the camera can be calibrated to focus on distant objectives in order to capture this kind of "rain drop aspect". Alternatively, if the camera is calibrated to focus on the close objects, the raindrop size and shape must be adapted accordingly in the calculations.

Hence, in case of still cameras, the pictures must be taken accordingly (around 0.5 s), but the present principles can evolve to deal with different ones—from 0.0001 s to a few seconds (e.g., but not limited to, 2 or 3 seconds). For the higher shutter speeds, the raindrop will appear most like a sphere instead of lines. The drop size calculation must be calculated depending on the speed of the raindrop (for example, using the expression v=200*sqrt(a)). If there is too much wind, the camera can use a tilt feature to move to another direction. In an embodiment, two cameras can be used that are orthogonal with respect to teach other. The estimation of rain fall per time would be an average of the rainfall estimate one frame. Integrating along the time, we can have accumulation and also perform statistical estimates.

We now describe how a cell phone can be modified or a radio transceiver can be built with this device for communicating this information from remote locations.

The same computer vision algorithm(s) can be implemented for smartphones/cell phones. The present principles deal with the different "camera specifications" of different cameras accordingly by calibrating the calculation parameters (e.g., angular grade, focal distance, resolution, frame rate, exposure time (if still camera), and so forth). These parameters will affect the calculation of the size of a raindrop and its velocity. These parameters can also affect the calculation of the mass of a raindrop. These parameters can thus be used to estimate the number of pixels for "each raindrop", and hence, the overall rain amount in a given time.

Once the rainfall is estimated, one can send this information to a "command center" or "control center", e.g., by using Short Message Service (SMS), General Packet Radio Service (GPRS), radio communication, and/or using another available computer network connection(s).

In an embodiment, the application can consider this connection layer as a "black box", and once the device is connected, it can send the data to any server/datacenter.

It is to be appreciated that the present principles can be implemented in various different scenarios. For example, regular surveillance or other repurposed cameras can be used. Also, in-vehicle approaches can be used. Further, such in-vehicle or other "inside" approaches can detect rain amount based on a glass plate such as a window in the vehicle or other item (e.g., house). Additionally, a webcam can be placed by a window or other location. These and other implementations of the present principles are readily determined by one of ordinary skill in the art given the teachings of the present principles provided herein, while maintaining the spirit of the present principles.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
storing a set of references images without rain and spanning a plurality of different light conditions;
capturing, using a camera, an image of a scene with rain;
selecting a reference image from the set of reference images based on the light condition of the captured image;
performing an arithmetic subtraction image processing operation between the captured image and the reference image to generate a subtraction image;
cutting off corner pixels in the subtraction image; and
estimating an amount of rain in the subtraction image based on previously calibrated values.

2. The method of claim 1, further comprising re-purposing the camera from another use.

3. The method of claim 1, further comprising:
performing image border detection processing on the subtraction image to detect the rain;
generating a binary mask responsive to a result of the border detection image processing, the binary mask having a first pixel value indicative of an absence of rain and having a second pixel value indicative of a presence of rain; and
performing a count of pixels having rain based on a total number of occurrences of at least one of the first pixel value and the second pixel value.

4. The method of claim 3, wherein said estimating step generates an estimate of the amount of rain responsive to the count of pixels.

5. The method of claim 3, wherein the image border detection processing comprises border detection, line detection, and at least one of Fourier Transformation and wavelet transformation.

6. The method of claim 3, wherein the image border detection processing comprises applying at least one of a Fourier transform and a wavelet transform to the subtraction image to at least one of identify and enhance frequencies which describe textures of raindrops.

7. The method of claim 3, wherein the image border detection processing comprises performing line detection to detect lines of one or more particular orientations.

8. The method of claim 7, wherein the line detection comprises applying at least one Hough transform to the subtraction image.

9. The method of claim 1, wherein the reference image is selected from the set based upon a time correspondence between the reference image and the captured image.

10. The method of claim 1, wherein the arithmetic subtraction image processing operation comprises performing:

$$C(x,y)-T(x,y)=O(x,y),$$

where C denotes the captured image, T denotes the reference image, O denotes the subtraction image without a background and with at least one moving object, x denotes a first spatial orientation, and y denotes a second spatial orientation orthogonal with respect to the first spatial orientation.

11. The method of claim 1, further comprising performing a threshold filtering operation to cut off pixels in the subtraction image having an intensity below a threshold intensity.

12. The method of claim 1, wherein said step of estimating the amount of rain comprises setting a predetermined granularity and precision for at least one rain estimate.

13. The method of claim 1, further comprising generating a user-perceptible indication of the amount of rain.

14. The method of claim 1, further comprising training a set of calibrated values that include the previously calibrated values to improve a precision of a rain amount estimate generated by said estimating step.

15. The method of claim 1, wherein the captured image includes a plate glass from which the amount of rain is estimated.

* * * * *